June 1, 1965
T. J. BOLEK
3,186,807
CONVERTER-MUFFLER
Filed Jan. 2, 1962
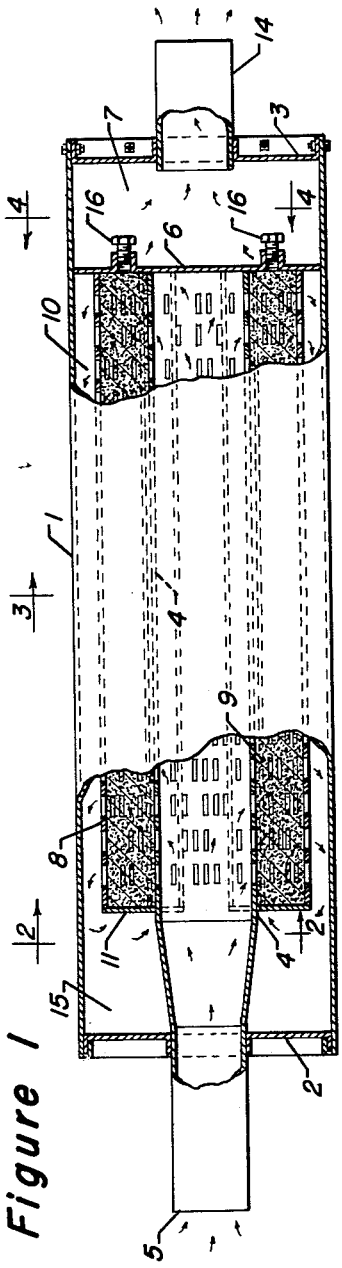
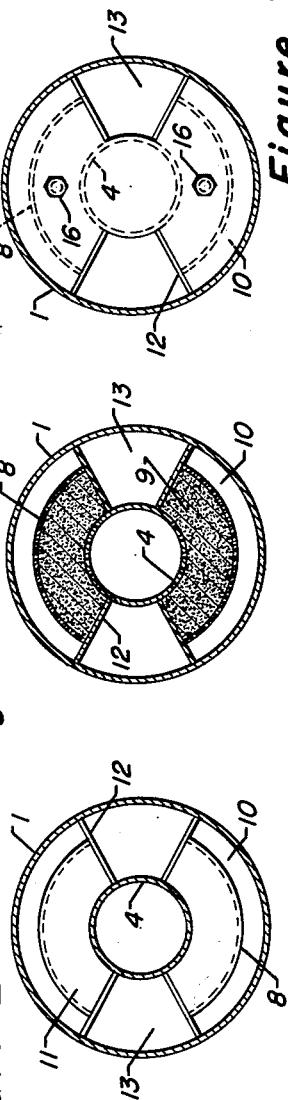
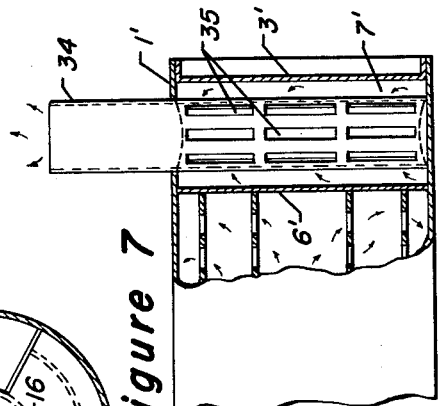
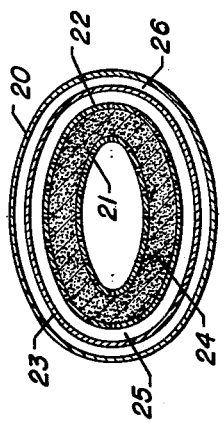
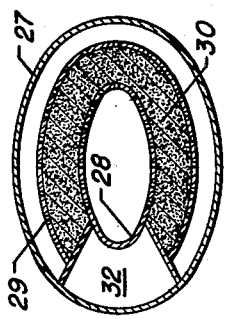
INVENTOR:
Ted J. Bolek
BY:
*Chester J. Giuliani*
*Philip T. Liggett*
ATTORNEYS United States Patent Office 3,186,807
Patented June 1, 1965

3,186,807
CONVERTER-MUFFLER
Ted J. Bolek, Franklin Park, Ill., assignor to Universal Oil Products Company, Des Plaines, Ill., a corporation of Delaware
Filed Jan. 2, 1962, Ser. No. 163,397
2 Claims. (Cl. 23—288)

This invention relates to an improved, simplified form of converter-muffler adapted to retain a fixed bed of solid contact material for treatment of engine exhaust gases. In particular, the device provides for the catalytic conversion and purification of an exhaust gas stream by an arrangement which provides a double reverse type of gas flow therein and a resulting uniform pressure drop through an annular or arcuate shaped catalyst bed, or beds.

The desirability of removing or converting the noxious compounds of vehicular exhaust gases has been generally well established. Such exhaust gases contain one or more components as unburned hydrocarbons, carbon monoxide, nitrogen oxides, sulfur compounds, partially oxidized products, etc., in various concentrations, and part of all of these components contribute to the smog problem presently facing various geographical areas of the United States and other countries.

In order to overcome the problem of smog and of atmospheric contamination, it has been proposed to use "afterburners" or various catalytic devices in the exhaust gas system of a vehicle in order to overcome the contamination problem. In the catalytic operation, the hot gases issuing from the motor exhaust manifold are mixed with a quantity of secondary or combustion air and the resulting mixture passed through a catalyst bed maintained with a conversion zone so as to effect a more or less complete oxidation of the carbon monoxide and unburned hydrocarbons present in the exhaust stream. The use of a catalytic method and apparatus also provides for the initiation of the oxidation reaction at lower temperatures than might otherwise be possible, and effectively eliminates the need for igniting means which is generally used with most types of "afterburners" or other apparatus which depend strictly upon thermal conversion conditions.

A preferred form of exhaust gas conversion apparatus embodies a design and construction which provides for the internal placement or positioning of a catalyst bed such that it may be utilized in an efficient manner and to the maximum degree. It is not intended to limit the present invention to the use of any one type of catalyst since there are now improved catalyst compositions availiable which will retain their catalytic efficiency for long periods of operation. The catalyst is used in particle form, such as spheres, cylinders, and/or pellets, and is disposed in a suitable retaining section providing for uniform flow therethrough.

It is a principal object of the present invention to provide a converter which is designed to effect the efficient utilization of a solid particulated contact material for the conversion of a waste gas stream, and particularly from an automotive exhaust manifold.

It is a further object of the present invention to provide a converter which is generally conventional in its external design and appearance.

It is also an object of the present invention to provide a converter construction which is capable of effecting gas-solid contact under conditions of uniform space velocity throughout the length of the bed with a minimum of pressure drop therethrough.

In one embodiment, the present invention provides a catalytic converter-muffler for treating an exhaust gas stream, comprising in combination, a cylindrically shaped outer housing with end closure members, transverse partition plate means spaced from one end of the housing and defining a downstream end manifold section therein, an exhaust gas port through the housing communicating with the manifold section, an axially or centrally positioned partially perforated conduit extending from the transverse plate means in an upstream direction through the remaining portion of the housing and through the end closure member therein, elongated perforate partitioning means spaced from and paralleling the central conduit within the housing, such partitioning means extending longitudinally from said transverse partition plate means to within a short spaced distance from the farther end of the housing and defining with the central conduit means at least one perforate particle retaining section, additional transverse plate means between the spaced end portions of the perforate partitioning means and said conduit to provide end closure means for the particle retaining section and to define an end plenum section between the latter and the opposing end closure member of the housing, elongated non-perforate partitioning means within said housing coextensive with said perforate partitioning means and defining at least one longitudinal gas collecting manifold section and at least one longitudinal gas passageway section, a multiplicity of perforations in the central conduit adjacent to and coextensive with the particle retaining section, gas port means within said additional transverse plate means to provide gas passage from the manifold section to the end plenum section and gas port means in first said transverse plate means from the longitudinal gas passageway section to the end manifold section, whereby a gas stream is passed in a tortuous path from the axial conduit to an adjacent perforate particle retaining section, from the latter to the longitudinal manifold section and then to said end plenum section, from the latter through the longitudinal gas passageway section and into the end manifold section, then from the latter to the exhaust gas port.

In one structural embodiment, the longitudinal perforated partitioning means which is spaced from the central conduit means to form a catalyst or particle retaining section may be entirely cylindrical, or oval, in order to provide an annular shaped bed. Alternatively, the partitioning may be positioned to form one or more arcuate shaped sections of less than 360° such that the particle retaining section, or sections, extends less than 360° around the central inlet conduit. Where the catalyst bed is maintained in an entirely annular shaped zone, then the elongated non-perforate partitioning means which is spaced from the catalyst bed and coextensive therewith, may likewise be of cylindrical shape and provide a longitudinal manifold section with an annular shape. On the other hand where one or more arcuate shaped catalyst sections are formed in the housing, then correspondingly shaped coextensive manifold sections are formed adjacent to and around the catalyst retaining section. Still further, the contacted gas outlet passageway also formed by the elongated non-perforate partitioning means, will, in the case of an annular catalyst retaining section, be formed in an annular shape and will circumscribe the gas collecting manifold section, while in the case of an arcuate shaped catalyst retaining section, the gas passageway means may extend between the one or more catalyst retaining sections such that contacted gas may pass from the forwardly positioned gas plenum chamber to the opposing end and to the outlet manifold section to effect the discharge of the contacted gas stream.

In conventional types of exhaust gas converters, the gas stream usually passes in a one-way downstream direction from an inlet zone to a catalyst bed and from the latter to an outlet zone and exhaust gas port. In such arrangements it is not readily possible to obtain a uniform space velocity through the catalyst bed without providing means for effecting a substantial pressure drop in the system. The present improved converter-muffler maintains a substantially uniform contacting of the catalyst particles, and a resulting uniform velocity therethrough, by reason of a substantially double reverse gas flow through the unit. In other words, the gas flow enters an axially positioned perforate conduit member which has means to block the flow at the downstream end and cause the flow to pass radially outwardly through an adjacent catalyst bed to a circumscribing manifold section which in turn is blocked at the downstream end thereof. The gas flow is then reversed to pass towards the inlet end of the housing to a plenum section which in turn communicates with a longitudinal gas passageway section paralleling the catalyst retaining section such that the gas flow is again reversed and caused to pass in the downstream direction of the housing to an outlet manifold and discharge port.

Since the exhaust gas stream is being blocked at the downstream end of the internal perforate conduit, there is additional velocity head which is converted to static pressure that in turn assists the radial flow through the downstream end of the catalyst section and aids in causing an improved reverse flow from the far end of the longitudinal manifold section. The result is a substantially uniform flow through the entire length of the cylindrically shaped, or arcuate shaped particle bed, with pressure differentials being substantially equal throughout the longitudinal length of the bed for all ranges of flow rates.

Another advantage of the present converter design is the generally conventional round or oval shape that may be utilized without the necessity of having outside dimensions that are much, if any, larger than present day automotive mufflers. Still further, the central inlet zone is of advantage in that it maintains the heat of the exhaust gas stream from the engine within the central core of the converter unit, to in turn assist in effecting catalytic ignition and combustion within the catalyst bed by the heat that is carried in the exhaust stream itself. In an efficient operation, it is desirable that the converter initiate catalytic combustion as soon as possible after the engine has started so that unburned hydrocarbons in the exhaust stream will not be discharged to the atmosphere.

The perforations in the straight pipe member and the catalyst retaining shell or partitioning members surrounding the perforate portion of the straight pipe member will, of course, be sized in relation to the size of the catalyst particles which are to be maintained within the apparatus. The physical shape of the catalyst particles may be such that they are in the form of spheres, cylinders or pellets, typically having a dimension of $\frac{1}{16}$ inch to about $\frac{1}{4}$ inch, although particles of larger or smaller dimensions may be employed, where desirable. Mixed sizes of catalysts may well be utilized. However, in loading the catalyst, care should be taken to be sure that the catalyst particles are uniformly packed in all portions of the bed to provide substantially uniform resistance to gas flow therethrough. As noted hereinbefore, it is not intended to limit the present invention to any one type of catalyst, but suitable oxidation catalysts include the metals of sub-groups I, V, VI, and VIII of the Periodic Table, particularly copper, silver, vanadium, chromium, iron, cobalt, nickel and platinum. These components may be used singly, in combination with one or more others, or may be composited with an inorganic refractory oxide such as alumina, silica-alumina, silica-alumina-zirconia, silica-thoria, silica-boria and the like.

The design and construction, as well as further advantageous features thereof, may better be set forth and explained by reference to the accompanying drawing and the following description thereof.

FIGURE 1 of the drawing is a sectional elevational view through one embodiment of the present improved cylindrical form of converter-muffler.

FIGURES 2, 3 and 4 of the drawing are cross sectional views through the embodiment of FIGURE 1 as indicated by the respective lines 2—2, 3—3 and 4—4.

FIGURE 5 of the drawing is a diagrammatic sectional view through a modified form of converter-muffler, which embodiment is shown as being generally oval in shape and having partitioning means to form generally annular shaped catalyst retaining, manifold and gas passageway sections.

FIGURE 6 of the drawing indicates still another modified embodiment of a converter-muffler, within the scope of the present invention, showing an arcuate shaped catalyst retaining section, a circumscribing arcuate shaped manifold section, and a single gas passageway section which extends along one side of the unit.

FIGURE 7 of the drawing indicates diagrammatically a modified end manifold and outlet port section, with the exhaust gas port means extending substantially at right angles with respect to the axis of the converter unit.

Referring now to FIGURES 1, 2, 3 and 4 of the drawing, there is shown a cylindrically shaped outer housing or shell 1 having a forward end closure plate 2 and a downstream closure plate 3 to provide a confined unit. Extending axially or centrally into the housing, through the end closure member 2, is a conduit member 4 having an exhaust gas inlet port 5. The conduit 4 stops short of the downstream end of the unit and is sealed to a transverse partitioning plate 6 that extends across the interior of the housing 1 at a spaced short distance from the end closure member 3 to in turn provide an end manifold section 7.

Spaced from internal wall portions of the conduit 4 are arcuate shaped perforate members 8 which serve to define catalyst retaining sections 9 which extend longitudinally adjacent to the inner conduit member 4. The partitioning plates 8 are also spaced a short distance from the inside wall of the housing 1 so as to likewise define longitudinal arcuate shaped manifold sections 10. As is best shown in FIGURE 2 of the drawing, suitable transverse plates 11 connect between with the ends of the partitioning members 8 and the exterior wall portion of the inner conduit 4 so as to provide end closure members for the elongated arcuate shaped catalyst retaining section 9. Radially positioned plates 12 extend longitudinally between the inner conduit 4 and the inside wall of the housing 1 to form elongated gas passageway sections 13, as well as to provide longitudinal side closures for the catalyst retaining sections 9.

As is evident from FIGURE 4 of the drawing, the transverse partitioning plate 6 is effective to close off the downstream ends of the inner conduit 4 and to connect with the longitudinal partitioning plates 8 and 12, to in turn confine the downstream ends of the particle retaining sections 9 and the manifold sections 10. However, openings are provided through plate 6 to align with and provide gas outlet ports at the downstream end of the elongated gas passageways 13, permitting the flow of contacted gases into the end manifold section 7 and their discharge from the unit by way of outlet pipe 14. At the other end of the unit, the transverse closure plates 11 merely serve to confine the end portions of the catalyst retaining sections 9 and leave openings or ports permitting the passage of contacted gases from the manifold section 10 into the end plenum chamber 15, and from the latter in a reverse flow to the gas passageway 13, to ultimately pass to the outlet end of the unit.

Perforations are provided in the wall portions of the inner conduit 4 which are adjacent to the catalyst retaining sections 9 so that the gas stream may be uniformly discharged throughout the entire length of the latter sections to effect in turn provide uniform contacting of the catalyst particles. The portions of the conduit 4 within the plenum chamber 15 and adjacent to the longitudinal gas passageway 13 are of course non-perforate to preclude any gas flow bypassing directly to the outlet end of the unit, without having passed through the catalyst bed. The perforations in the conduit 4 as well as in the curved plate sections 8 are sized, as hereinbefore noted, to accommodate the particulated material being maintained within the confined sections 9 to preclude loss of particles therefrom while the unit is in operation. For purposes of filling or replacing catalyst particles within the sections 9, suitable fill plugs 16 are placed within threaded openings in plate 6 at the downstream end of the unit. The opposing end closure plate 3 is removably connected with the end of housing 1 by bolts or clamping means so that it is possible to be readily removed and permit access to the removable fill plugs 16. At the other end of the unit the end closure plate 2 may be fixedly attached to the end of housing or shell 1 by the use of a rolled joint, welding or other sealing means.

It may be seen from the present construction and arrangement of the embodiment of FIGURE 1, that the exhaust gas stream which is being subjected to catalytic contact enters the central portion of the unit and enflows radially outwardly through the two opposing catalyst sections 9 into opposing gas collecting manifold sections 10, all of which are blocked off at the downstream end by means of partitioning plate 6 such that the gas flow reverses in direction and is forced toward the forward end of the unit and the gas plenum section 15. The exhaust gas stream then again reverses direction, passing from plenum 15 into the longitudinal gas passageways 13 to pass parallel with and in heat exchange relationship with the inner conduit 4, the arcuate shaped catalyst retaining sections 9 and the arcuate shaped gas manifold section 10. At the downstream end of the unit, the contacted gases pass from the passageways 13 into the manifold 7 and thence outwardly through the outlet 14. It may again be pointed out, with reference to the drawing, that a substantially uniform flow through the catalyst bed is obtained by reason of the reverse gas flow within the unit. At the upstream end of the unit, as a part of the gas flow from the inner conduit 4 through the upstream end of beds 9 into the opposing manifold sections 10, there is a low static pressure opposed by a still lower static pressure in the manifold sections, as compared with the downstream end of the unit, while at the downstream ends of the beds 9, by virtue of the downstream end of the conduit 4 being blocked by plate 6, there is an increased static pressure which assists in effecting flow through the downstream portions of the catalyst which in turn results in a flow through the catalyst particles at that zone at a rate substantially equivalent to that through the forward end portions of the catalyst bed. Stated another way, the downstream end of conduit 4 has a resulting high static pressure, opposed in the manifold sections 10 by a lower, but still relatively high static pressure, so that differential pressure and flow through the catalyst is about equalized for the entire length thereof. The present reverse flow design of the unit has also been found to be of advantage in that the uniform pressure differentials are obtained for all ranges of gas flow rates through the unit, with low static pressures existing in the forward end and higher static pressures existing in the downstream end at levels producing self compensating differentials and uniform flow all the way along the beds 9.

The aforedescribed embodiment is of a symmetrical design providing two opposing catalyst retaining sections and their adjacent manifold sections, together with two opposing longitudinal gas passageway sections to carry contacted gases from one end of the unit to the other; however, it is, of course, obvious that more than two catalyst retaining sections may be formed within a cylindrical or oval shaped housing by the use of suitable longitudinal partitioning means effective to divide the interior of the housing into the desired number of segmental units. Also, as previously noted, the construction and arrangement may have single, substantially annular shaped zones within the unit.

Referring now to FIGURE 6 of the drawing, there is shown, in a diagrammatic cross sectional manner, an oval shaped housing or shell 20 having an oval shaped inner conduit member 21 and spaced oval shaped partitioning members 22 and 23, all of which may be spaced and arranged to define an oval shaped catalyst retaining section 24, a circumscribing longitudinal manifold section 25 and a return gas passageway section 26. Each of the foregoing sections is retained between internal transverse partitioning plates, such as set forth and described in connection with FIGURES 1 through 4 of the drawing, so that end manifold sections are maintained in the unit. Such an embodiment still maintains the double reverse flow through the unit, in the manner described heretofore for FIGURE 1. In other words, the incoming gas flow passing downstream through the internal axial conduit 21 is distributed radially through the catalyst bed 24 and to the manifold section 25, from which the flow is forward into a plenum chamber, and thence reversed again to pass through the outer annular gas passageway zone 26 to the outlet end of the unit.

In FIGURE 5 of the drawing, there is shown in a diagrammatic manner, still another modified or alternative construction, where a single longitudinal gas passageway extends along one side of the unit. In an external design and appearance similar to the embodiment of FIGURE 6, there is shown an oval housing or shell 27 and an oval shaped inner conduit member 28. A spaced perforate partitioning plate 29, having an arcuate shape, and being less than 360° in circumference, is positioned to form an arcuate shaped catalyst retaining section 30 confined around a portion of the wall of the conduit 28. Spaced radially positioned longitudinal partitions serve to provide wall portions for the catalyst retaining section 30, as well as for a longitudinal gas passageway section 32. As in the previously described embodiments, the longitudinal partitioning means extend lengthwise between an end plenum section and an outlet end manifold section, in turn formed by suitable transverse partitioning means spaced from the inside ends of the housing. Here again the gas flow through the unit is in a double reverse flow pattern, with the entering gas stream passing from the inner axial conduit 28 outwardly through the catalyst section 30 into a circumscribing gas manifold section 33, thence from the latter in a reverse flow toward the forward end of the unit to a plenum chamber which in turn causes a reversal of gas flow into the longitudinal gas passageway 32, such that the gases may then be discharged through an outlet manifold section and an exhaust gas port.

In FIGURE 7 of the drawing there is shown a modification in the construction at the outlet end of the unit, with exhaust gas pipe 34 extending at substantially right angles with respect to the longitudinal axis thereof. There is indicated diagrammatically a housing or shell 1' which may be similar in construction and arrangement to that shown in FIGURE 1, with a suitable end closure member 3' and an inner transverse partitioning plate 6' which defines a substantially confined manifold section 7'. The outlet pipe 34 is provided with suitable slots or openings 35 within the manifold section 7' such that the contacted exhaust gas stream may flow from the manifold section 7' into the interior of the pipe 34 and be discharged from the unit. The modified arrangement may be of advantage in certain installations to permit readily discharging the contacted exhaust gas stream to the atmosphere without passing in a generally axial direction as indicated in the embodiment of FIGURE 1. Still other constructions and arrangements may, of course, be provided to effect the discharge of the contacted gas stream from a converter unit, with a particular design being utilized to conform with the orientation or space limitations of a particular installation.

The embodiments which have been heretofore described have been referred to as being substantially cylindrical or oval and as having a substantially uniform cross section throughout their longitudinal length; however, converter designs may have sloped segments to provide tapered catalyst sections within the interior of the unit and accompanying tapering manifold sections, especially where it is desirable to control pressure drops and obtain uniformity of flow through any one portion of the unit. Also, if desired, suitable insulation may be used in combination with the converter unit. The insulation functioning to conserve heat and maintain more rapid activation of catalyst following engine startup, as well as to protect floor boards, wiring or other equipment, which may be adjacent to the converter in a vehicular installation.

I claim as my invention:

1. A catalytic muffler comprising a substantially cylindrical outer housing having a pair of end closures, a transverse partition plate across the housing and spaced from one of said closures to form an end manifold section within the housing, an exhaust gas outlet from said manifold section, an axially positioned partially perforated conduit extending from said plate through the remainder of said housing and through the other of said end closures, an elongated perforate partition extending longitudinally from said plate to a short spaced distance from said other end closure, said perforate partition being spaced from said conduit and from the inner wall of the housing to form a particle retaining section adjacent the conduit and a longitudinal manifold section adjacent said inner wall, catalyst particles in said retaining section, a second transverse partition plate extending between said conduit and the end of said elongated perforate partition spaced from said other end closure, said second plate providing end closure means for the particle retaining section and forming with said other end closure of the housing a plenum section in communication with said longitudinal manifold section, elongated imperforate partitioning means in the housing coextensive with said elongated perforate partition and extending between said conduit and the housing to form a longitudinal gas passageway connecting between said plenum section and said end manifold section, and means for introducing a gas to said conduit to pass from the latter radially through the particle retaining section to said longitudinal manifold section into said plenum section and then through said longitudinal gas passageway into said end manifold section for discharge through said exhaust gas outlet.

2. The muffler of claim 1 further characterized in that said elongated perforate partition is of arcuate shape and said elongated imperforate partitioning means comprises a pair of spaced radially positioned plates extending between said conduit and the inner wall of the housing.

References Cited by the Examiner

UNITED STATES PATENTS

| 858,455 | 7/07 | Hedstrom | 181—53 X |
| 1,157,005 | 10/15 | Kehoe | 181—53 X |
| 2,396,190 | 3/46 | Morgan et al. | |
| 2,639,224 | 5/53 | McAfee | 23—288 |

FOREIGN PATENTS

| 675,355 | 5/39 | Germany. |
| 436,331 | 10/35 | Great Britain. |

MORRIS O. WOLK, *Primary Examiner.*

GEORGE D. MITCHELL, *Examiner.*